(12) United States Patent
Chen

(10) Patent No.: US 10,386,979 B2
(45) Date of Patent: Aug. 20, 2019

(54) TOUCH PANEL STRUCTURE HAVING A SHIELDING LAYER AND MANUFACTURING METHOD THEREOF

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventor: Chun-Ming Chen, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTION LIMITED, Miaoli County (TW)

( * ) Notice: Subject to any disclaimer, the term of this patent is extended or adjusted under 35 U.S.C. 154(b) by 1 day.

(21) Appl. No.: 15/818,776

(22) Filed: Nov. 21, 2017

(65) Prior Publication Data

US 2019/0114000 A1    Apr. 18, 2019

(30) Foreign Application Priority Data

Oct. 16, 2017  (CN) .......................... 2017 1 0997512

(51) Int. Cl.
*G06F 3/044*    (2006.01)
*G06F 3/041*    (2006.01)

(52) U.S. Cl.
CPC ............ *G06F 3/044* (2013.01); *G06F 3/0443* (2019.05); *G06F 3/0446* (2019.05); *G06F 3/0412* (2013.01); *G06F 2203/04102* (2013.01); *G06F 2203/04103* (2013.01); *G06F 2203/04107* (2013.01); *G06F 2203/04111* (2013.01)

(58) Field of Classification Search
CPC ....................................................... G06F 3/044
USPC ......................................................... 345/174
See application file for complete search history.

(56) References Cited

U.S. PATENT DOCUMENTS

| 2011/0304572 A1* | 12/2011 | Wang | ...................... | G06F 3/041 345/173 |
| 2013/0147730 A1* | 6/2013 | Chien | .................... | G06F 3/0412 345/173 |

(Continued)

*Primary Examiner* — Long D Pham
(74) *Attorney, Agent, or Firm* — CKC & Partners Co., LLC

(57) ABSTRACT

The present disclosure provides a touch panel structure, including a display device, a dielectric layer, a first sensing circuit, a second sensing circuit and a shielding layer. The dielectric layer is disposed on the display device. The first sensing circuit includes a plurality of first sensing electrodes and a plurality of conducting bridges, wherein the first sensing electrodes are disposed on the dielectric layer, and the conducting bridges are disposed between the dielectric layer and the display device. Adjacent ones of the first sensing electrodes are electrically connected with each other through one of the conducting bridges. The second sensing circuit includes a plurality of second sensing electrodes, which are disposed on the dielectric layer. The second sensing circuit is insulated from and crosses the first sensing circuit. The shielding layer is disposed between the dielectric layer and the display device and coplanar with the conducting bridges.

9 Claims, 10 Drawing Sheets

(56) References Cited

U.S. PATENT DOCUMENTS

2016/0274398 A1* 9/2016 Hirakata ............... G06F 3/0416
2018/0341348 A1* 11/2018 Zeng ..................... G06F 3/044

* cited by examiner

TOUCH PANEL STRUCTURE HAVING A SHIELDING LAYER AND MANUFACTURING METHOD THEREOF

CROSS-REFERENCE TO RELATED APPLICATION

This application claims priority to China Application Serial Number 201710997512.3, filed Oct. 16, 2017, which is herein incorporated by reference.

BACKGROUND

Field of Invention

The present invention relates to a touch panel structure and a manufacturing method thereof.

Description of Related Art

In recent years, capacitive touch panels are widely used in a variety of touch products due to its high sensitivity. Because of the trend of the flexible screens in the future, industry has committed to the development of a thinner stacked touch structure to meet the market demand. However, if the stacked touch structure is too thin, it may cause the distance between the touch sensing electrodes and the display device to be too small, resulting in a low signal-to-noise ratio and undesirably affecting the judgment of touching information.

In the conventional techniques, there are an insulating layer and a shielding layer disposed between the sensing electrodes and the display device, in order to solve the above-mentioned issue. But this approach increases the total thickness of the touch device, and that does not meet the trend of development of touch device in the future. Hence, how to solve the issue mentioned above and simultaneously take the dimension of the touch device into account is one of the major problems.

SUMMARY

The invention provides a touch panel structure, comprising a display device, a dielectric layer, a first sensing circuit, a second sensing circuit and a shielding layer. The dielectric layer is disposed on the display device. The first sensing circuit includes a plurality of first sensing electrodes and a plurality of conducting bridges, wherein the first sensing electrodes are disposed on the dielectric layer, and the conducting bridges are disposed between the dielectric layer and the display device. Adjacent ones of the first sensing electrodes electrically connect to each other through one of the conducting bridge. The second sensing circuit includes a plurality of second sensing electrode disposed on the dielectric layer, and is insulated from and crosses the first sensing circuit. The shielding layer is disposed between the dielectric layer and the display device, and coplanar with the conducting bridges and insulated from the conducting bridges, wherein the conducting bridges and the shielding layer are constituted of a conductive layer.

In accordance with one or more embodiments of the present disclosure, the touch panel structure further includes an adhesive layer and a substrate, wherein both the adhesive layer and the substrate are disposed between the conductive layer and the display device, wherein the substrate is disposed on the adhesive layer.

In accordance with one or more embodiments of the present disclosure, the touch panel structure further includes an adhesive layer and a substrate, wherein the adhesive layer is disposed between the conductive layer and the display device. The substrate is disposed on the first sensing electrode and the second sensing electrode.

In accordance with one or more embodiments of the touch panel structure of the present disclosure, the distance between the shielding layer and each of the conducting bridge is equal to or greater than 5 µm.

In accordance with one or more embodiments of the touch panel structure of the present disclosure, a material of the conductive layer is indium tin oxide (ITO), poly(3,4-ethylenedioxythiophene) (PEDOT), carbon nanotube (CNT), silver nanowire (AgNW), polyvinylidene difluoride (PVDF), transparent conductive transfer film (TCTF) or a combination thereof.

In accordance with one or more embodiments of the touch panel structure of the present disclosure, a thickness of the dielectric layer is equal to or greater than 0.5 µm.

The invention provides a manufacturing method of a touch panel structure, comprising: forming a conductive layer; etching the conductive layer to form a shielding layer and a plurality of conducting bridges, wherein the conducting bridges and the shielding layer are positioned on a same plane; forming a dielectric layer over the conductive layer; forming a plurality of sensing electrodes and a plurality of first sensing circuits on the dielectric layer, the first sensing circuits are insulated from the sensing electrodes; and electrically connecting adjacent two of the sensing electrodes to a corresponding one of the conducting bridges to form a plurality of second sensing circuits.

In accordance with one or more embodiments of the manufacturing method of the present disclosure, forming the conductive layer includes forming the conductive layer on a first display device or a substrate.

In accordance with one or more embodiments of the manufacturing method of the present disclosure, the conductive layer is formed on the substrate, and the substrate is bonded to a second display device.

The invention provides a manufacturing method of a touch panel structure, comprising: providing a substrate; forming a plurality of sensing electrodes and a plurality of first sensing circuits on the substrate, the first sensing circuits are insulated from the sensing electrodes; forming a dielectric layer on the sensing electrodes and the first sensing circuits; forming a shielding layer and a plurality of conducting bridges on the dielectric layer, and electrically connecting adjacent two of the sensing electrodes to a corresponding one of the conducting bridges, wherein the sensing electrodes are connected with the conducting bridges in series to form a plurality of second sensing circuits; and bonding a display device with the shielding layer and the conducting bridges.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
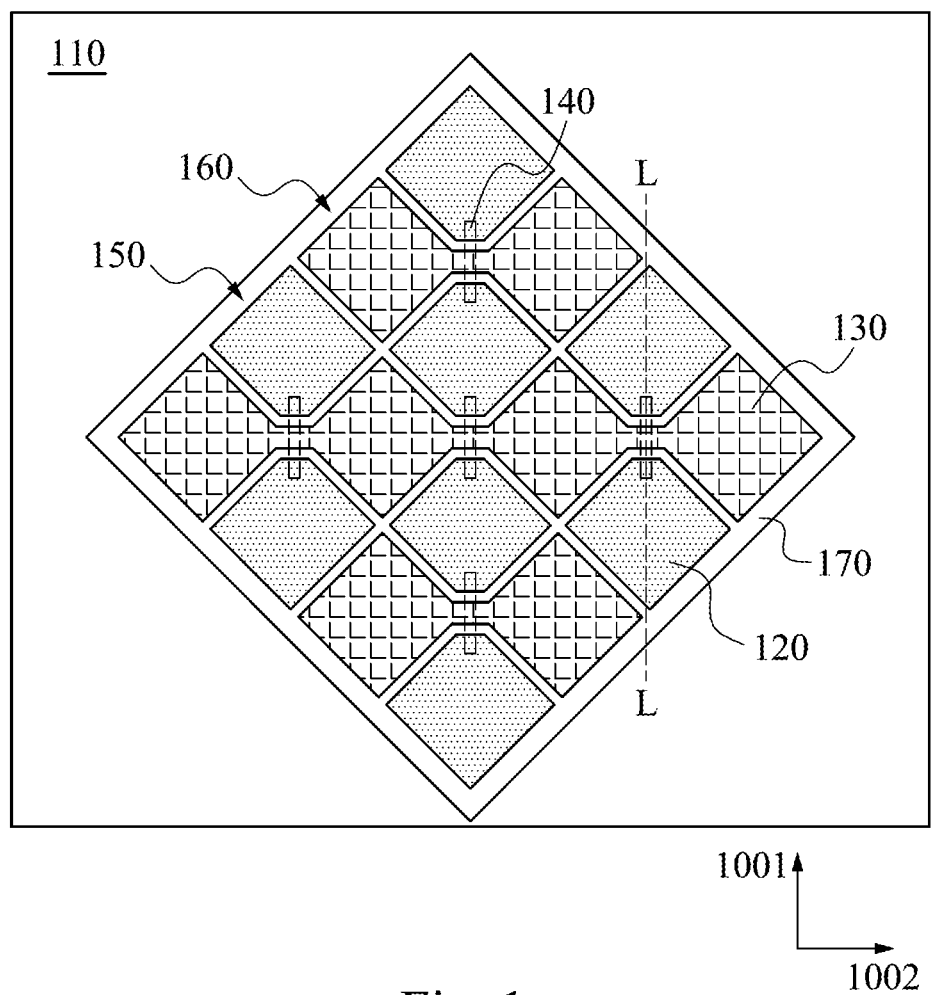
FIG. 1 illustrates a top view of the touch panel structure according to some embodiments in the present disclosure.

Reference will now be made in detail to the present embodiments of the disclosure, examples of which are illustrated in the accompanying drawings. Wherever possible, the same reference numbers are used in the drawings and the description to refer to the same or like parts.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features are disposed between the first and second features, such that the first and second features are not in direct contact. In addition, the present disclosure may repeat reference numerals and/or letters in the various examples. This repetition does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a top view of a touch panel structure 100. A plurality of first sensing circuits 150 and a plurality of second sensing circuits 160 are disposed on a display device 110, in which each first sensing circuit 150 crosses one or more the second sensing circuits 160. Each first sensing circuit 150 and each second sensing circuit 160 are insulated from each other. Each first sensing circuit 150 includes a plurality of first sensing electrodes 120 and a plurality of conducting bridges 140. Two adjacent first sensing electrodes 120 are electrically connected to each other through a corresponding one of the conducting bridges 140 in a first direction 1001. Each second sensing circuit 160 includes a plurality of second sensing electrodes 130. The first sensing electrodes 120 are insulated from the second sensing electrodes 130. That is, the first sensing electrodes are not in direct contact with the second sensing electrodes 130. A dielectric layer 170 is disposed between the display device 110 and each of the first sensing electrodes 120. The display device 110 may be thin film transistor liquid crystal display (TFT-LCD) devices, organic light-emitting diode display (OLED display) devices or other suitable devices.

It is noteworthy that, in certain embodiments of the present disclosure, the first sensing circuits 150 and the second sensing circuits 160, configured to sense touch points, may be exchangeable. That is to say, depending on the definition of the driving chip, the first sensing circuit 150 and the second sensing circuit 160 may respectively extends along the directions 1001 and 1002, or alternatively the directions 1002 and 1001 in FIG. 1.

Figure 2:
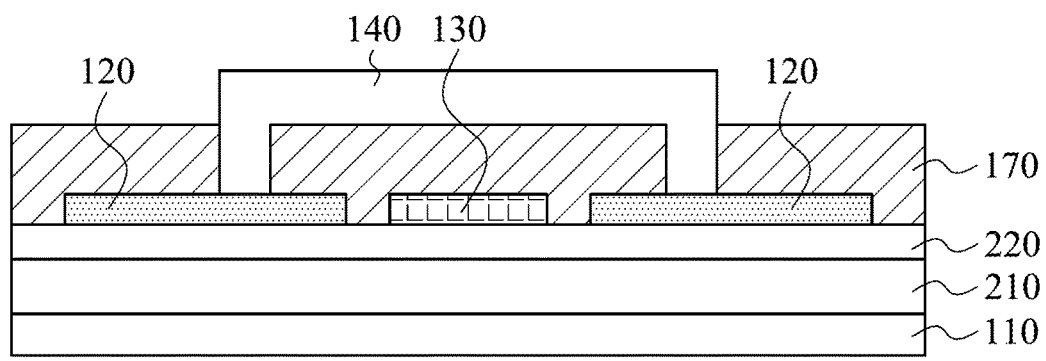
FIG. 2 is a cross-sectional view illustrating a conventional touch panel.

FIG. 2 is a cross-sectional view illustrating a conventional touch panel, which solves the issue of low signal-to-noise ratio due to the distance between the sensing electrodes and the display device being too small. As shown in FIG. 2, in order to solve the mentioned issue, there are an insulating layer 220 and a shielding layer 210 between the display device 110 and each of the first sensing electrodes 120 and the second sensing electrodes 130. The first sensing circuit 150 includes a number of first sensing electrodes 120 and the conducting bridges 140, in which two adjacent first sensing electrodes 120 are electrically connected through a corresponding one of the conducting bridges 140. The second sensing circuit 160 includes a number of second sensing electrodes 130. The first sensing circuit 150 and the second sensing circuit 160 are disposed on the insulating layer 220. The dielectric layer 170 is disposed on the first sensing electrodes 120 and the second sensing electrodes 130. It is noteworthy that the conducting bridges 140 are disposed on the dielectric layer 170.

In order to excellently resolve the technical issues discussed above and take the entire thickness thereof into account, the present disclosure provides a touch device with a thin thickness and an improved signal-to-noise ratio.

Figure 3:
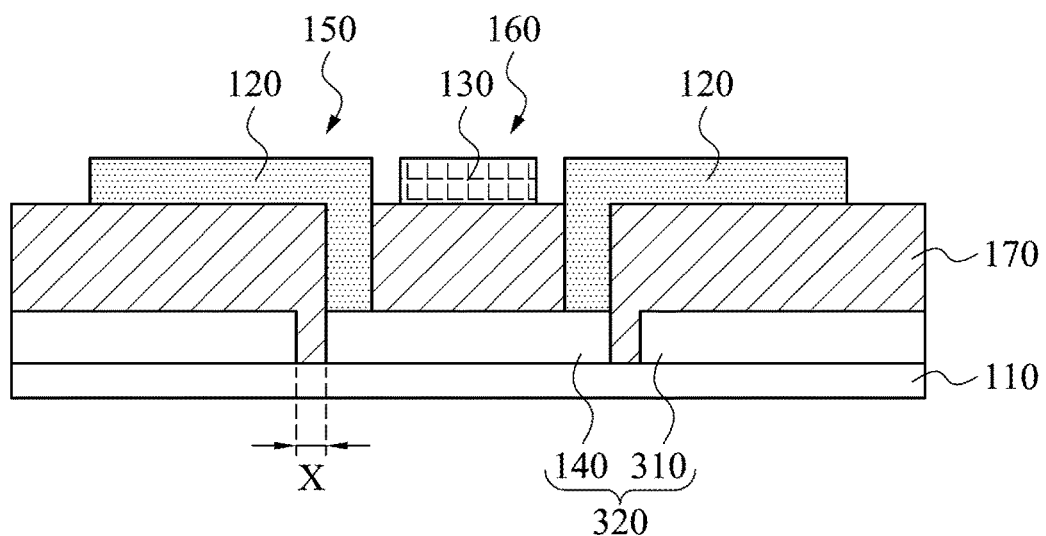
FIG. 3 illustrates a cross-sectional view of the touch panel structure along line L-L in FIG. 1 according to an embodiment of the present disclosure.

FIG. 3 illustrates a cross-sectional view of the touch panel structure along line L-L in FIG. 1 according to an embodiment of the present disclosure. The touch panel structure includes a display device 110, a dielectric layer 170, at least a first sensing circuit 150, at least a second sensing circuit 160, and a shielding layer 310.

The display device 110 of this embodiment may be similar to the display device 110 shown in FIG. 1. The display device 110 may be TFT-LCD, OLED display or other suitable devices.

The first sensing circuit 150 includes a plurality of first sensing electrodes 120 and a plurality of conducting bridges 140. The first sensing electrodes 120 are disposed on the dielectric layer 170, and the conducting bridges 140 are disposed between the dielectric layer 170 and the display device 110. In the first sensing circuit 150, two adjacent first sensing electrodes 120 are electrically connected through a corresponding one of the conducting bridges 140. The second sensing circuit 160 includes a plurality of second sensing electrodes 130, wherein two adjacent second sensing electrodes 130 are electrically connected to each other through a neck portion. The second sensing circuit 160 is disposed on the dielectric layer 170, and the second sensing circuit 160 is electrically insulated from the first sensing circuit 150. More particularly, the second sensing circuit 160 crosses over the first sensing circuit 150 and is insulated from the first sensing circuit 150. In certain examples, the first sensing electrodes 120 and the second sensing electrodes 130 may be formed by indium tin oxide (ITO), silver nanowire (AgNW), carbon nanotube (CNT), graphene, but not limited to these.

The shielding layer 310 is disposed on the display device 110, and the conducting bridges 140 are also disposed on the display device 110. It is noteworthy that, unlike the prior art, the shielding layer 310 is coplanar with the conducting bridges 140 in this embodiment. The shielding layer 310 and the conducting bridges 140 are constituted or made of a conductive layer 320. The distance X between the shielding layer 310 and a corresponding conducting bridge 140 is equal to or greater than 5 μm, such as 6 μm, 7 μm, 8 μm, 9 μm, 10 μm, 15 μm or 20 μm. The shielding layer 310 is not in contact with the conducting bridges 140, and therefore is insulated from the conducting bridges 140. In certain examples, the material of the shielding layer 310 and/or the conducting bridges 140 may be indium tin oxide (ITO), poly(3,4-ethylenedioxythiophene) (PEDOT), carbon nanotube (CNT), silver nanowire (AgNW), polyvinylidene difluoride (PVDF), transparent conductive transfer film (TCTF) or a combination thereof. The material of the shielding layer 310 may be same as or different from the material of the conducting bridges 140.

The shielding layer 310 is used to shield the first sensing circuit 150 and the second sensing circuit 160 from the interference with the display device 110. When the distance between the capacitive touch panel structure and the display device 110 decreased, the interference from the display device 110 becomes strong. Therefore, the shielding layer 310 needs to be disposed between the display device 110 and each of the first sensing circuit 150 and the second sensing circuit 160 for the purpose of improving the signal-to-noise ratio of detection. In certain examples, the material of the shielding layer 310 usually may be, but not limited to, a conductive material.

Referring to FIG. 3, the dielectric layer 170 is disposed on the conductive layer 320 (e.g., shielding layer 310 and conducting bridges 140). In certain examples, the dielectric layer 170 is filled in the space between the shielding layer 310 and the conducting bridges 140. In certain examples, the thickness of the dielectric layer 170 is equal to or greater than 0.5 μm, such as 0.6 μm, 0.7 μm, 0.8 μm, 0.9 μm, 1 μm, 2 μm or 5 μm. In certain examples, the material of the dielectric layer 170 may include organic fluorine-based thermoplastic elastomer (TPF), photosensitive resin, thermosetting resin, photoresist, over coating material (OC material), insulation paste or other suitable material.

Figure 4:
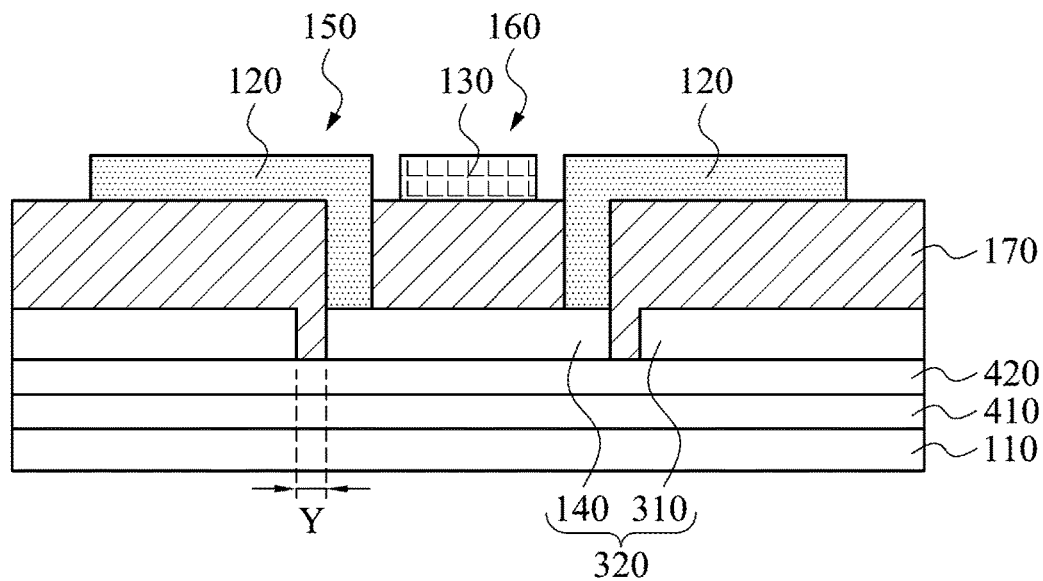
FIG. 4 is a cross-sectional view illustrating a touch panel structure along line L-L in FIG. 1 according to another embodiment of the present disclosure.

FIG. 4 is a cross-sectional view illustrating a touch panel structure along line L-L in FIG. 1 according to another embodiment of the present disclosure. In the embodiment, the touch panel structure includes a display device 110, a dielectric layer 170, at least a first sensing circuit 150, at least a second sensing circuit 160, a shielding layer 310, an adhesive layer 410 and a substrate 420.

The first sensing circuit 150 includes first sensing electrodes 120 and the conducting bridges 140. The second sensing circuit 160 includes second sensing electrodes 130, and two adjacent second sensing electrodes 130 are electrically connected to each other. The shielding layer 310 and the conducting bridges 140 are disposed on the substrate 420. The shielding layer 310 and the conducting bridges 140 are constituted of or made from a conductive layer 320. The dielectric layer 170 is disposed on the conductive layer 320, and the first sensing electrodes 120 and the second sensing electrodes 130 are disposed on the dielectric layer 170. In the first sensing circuit 150, two adjacent first sensing electrodes 120 are electrically connected through a corresponding one of the conducting bridges 140. The second sensing circuit 160 and the first sensing circuit 150 are electrically insulated from each other. More particularly, the second sensing circuit 160 crosses over the first sensing circuit 150 and is insulated from the first sensing circuit 150. The materials of the first sensing electrodes 120 and the second sensing electrodes 130 may be the same as these described above in connection with FIG. 3, and is not repeatedly described herein.

Unlike FIG. 3, a substrate 420 and an adhesive layer 410 are included in the embodiment shown in FIG. 4. The substrate 420 and the adhesive layer 410 are disposed between the display device 110 and the conductive layer 320. The substrate 420 is disposed on the adhesive layer 410, and the adhesive layer 410 is disposed on the display device 110. The substrate 420 is bonded to the display device 110 by the adhesive layer 410. In certain examples, the material of the adhesive layer 410 may be optical clear adhesive (OCA), optical clear resin (OCR) or a combination thereof. In certain examples, the material of the substrate 420 may be polyethylene terephthalate (PET), cyclo olefin polymer (COP), triacetyl cellulose (TAC), polyimide (PI), polycarbonate (PC), hydrophilic polyvinylidene difluoride (H-PVDF) or a combination thereof.

The dielectric layer 170 is disposed on the conductive layer 320. In certain examples, the dielectric layer 170 is filled in the space between the shielding layer 310 and the conducting bridges 140. In certain examples, the thickness of the dielectric layer 170 is equal to or greater than 0.5 μm, such as 0.6 μm, 0.7 μm, 0.8 μm, 0.9 μm, 1 μm, 2 μm or 5 μm. The material of the dielectric layer 170 may be the same as these described above, and is not repeatedly described herein.

It is noteworthy that the shielding layer 310 is coplanar with the conducting bridges 140 in the embodiment shown in FIG. 4. The distance Y between the shielding layer 310 and the conducting bridge 140 is equal to or greater than 5 μm, such as 6 μm, 7 μm, 8 μm, 9 μm, 10 μm, 15 μm or 20 μm. The shielding layer 310 and the conducting bridges 140 are not electrically connected. In certain examples, the materials of the shielding layer 310 and the conducting bridges 140 may be the same as these described above, and are not repeatedly described herein.

The embodiment illustrated in FIG. 4 is an add-on type touch device, in which the touch sensing circuit are formed on the substrate 420 first, and then the substrate 420 with the touch sensing circuit is bonded to the display device 110 through the adhesive layer 410.

Figure 5:
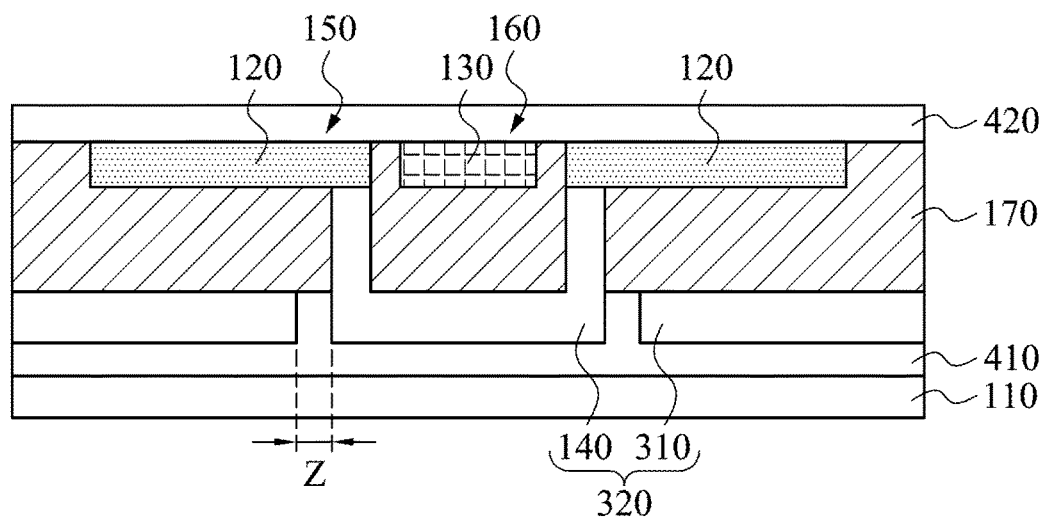
FIG. 5 illustrates a cross-sectional view of the touch panel structure along line L-L in FIG. 1 according to still another embodiment of the present disclosure.

FIG. 5 illustrates a cross-sectional view of the touch panel structure along line L-L in FIG. 1 according to still another embodiment of the present disclosure. In this embodiment, the touch panel structure includes a display device 110, a dielectric layer 170, at least a first sensing circuit 150, at least a second sensing circuit 160, a shielding layer 310, an adhesive layer 410 and a substrate 420.

The first sensing circuit 150 includes first sensing electrodes 120 and conducting bridges 140. The second sensing circuit 160 includes second sensing electrodes 130, and two adjacent second sensing electrodes 130 are electrically connected to each other. The shielding layer 310 and the conducting bridges 140 are disposed on the adhesive layer 410. The shielding layer 310 and the conducting bridges 140 are constituted of or made from a conductive layer 320. The first sensing electrodes 120 and the second sensing electrodes 130 are disposed on the dielectric layer 170. In the first sensing circuit 150, two adjacent first sensing electrodes 120 are electrically connected through a corresponding one of the conducting bridges 140. The second sensing circuit 160 and the first sensing circuit 150 are electrically insulated from each other. More particularly, the second sensing circuit 160 crosses over the first sensing circuit 150 and is insulated from the first sensing circuit 150. The materials of the first sensing electrodes 120 and the second sensing electrodes 130 may be the same as these described above, and is not repeatedly described herein.

Unlike FIG. 3, the touch panel structure shown in FIG. 5 further includes an adhesive layer 410 and the substrate 420. The adhesive layer 410 is disposed between the display device 110 and the conductive layer 320. The substrate 420 is disposed on the dielectric layer 170, the first sensing electrodes 120 and the second sensing electrodes 130. In other words, the first sensing electrodes 120, the second sensing electrodes 130 and the dielectric layer 170 may be fabricated on the substrate 420. The adhesive layer 410 disposed on the display device 110 is used to bond the touch panel structure formed on the substrate 420 with the display device 110. In certain examples, the material of the adhesive layer 410 may be optical clear adhesive (OCA), optical clear resin (OCR) or a combination thereof. In certain examples, the material of the substrate 420 may be the same as these described above in connection with FIG. 4, and is not repeated hereinafter.

The dielectric layer 170 is disposed on the conductive layer 320, and filled in the space between the shielding layer 310 and the conducting bridges 140. In certain examples, the thickness of the dielectric layer 170 is equal to or greater than 0.5 μm, such as 0.6 μm, 0.7 μm, 0.8 μm, 0.9 μm, 1 μm, 2 μm or 5 μm. The material of the dielectric layer 170 may be the same as these described above, and is not repeatedly described herein.

It is noteworthy that the shielding layer 310 and the conducting bridges 140 are in the same layer in the embodiment in FIG. 5. The distance Z between the shielding layer 310 and the conducting bridge 140 is equal to or greater than 5 μm, such as 6 μm, 7 μm, 8 μm, 9 μm, 10 μm, 15 μm or 20 μm. The shielding layer 310 and the conducting bridges 140 are not electrically connected to each other. The materials of the shielding layer 310 and the conducting bridges 140 may be the same as these described above, and are not repeatedly described herein.

The embodiment illustrated in FIG. 5 is an add-on type touch device, in which the touch sensing circuit are formed on the substrate 420 first, and then the substrate 420 with the touch sensing circuit is bonded to the display device 110 through the adhesive layer 410.

Figure 6:
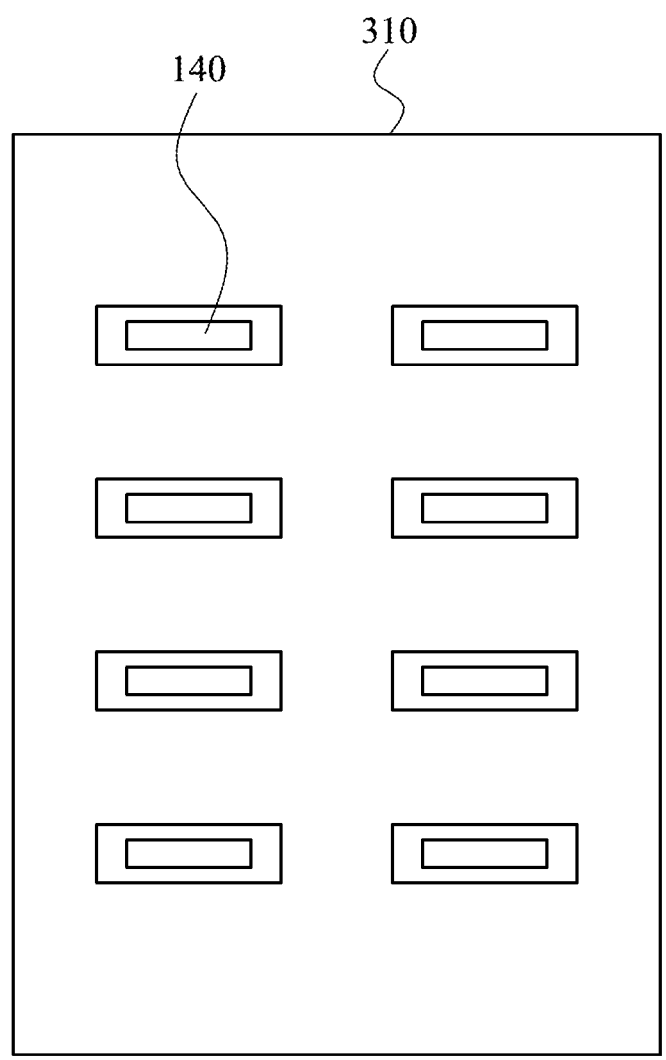
FIG. 6 illustrates a top view of the conductive layer according to an embodiment of the present disclosure.

FIG. 6 illustrates a top view of the conductive layer 320 according to an embodiment of the present disclosure. The conductive layer 320 includes a plurality of the conducting bridges 140 and the shielding layer 310. Each of the conducting bridges 140 is spaced apart from the shielding layer 310 by a gap. Therefore, the conducting bridges 140 are not in contact with the shielding layer 310 and not electrically connected thereto. The shielding layer 310 may be electrically connected to an external circuit (not shown), through which the electric noise on the shielding layer 310 induced from the display device 110 may be released. It is noted that there is no need to additionally form a conducting pad for the purposes of the connection with the external circuit since the shielding layer 310 and the conducting bridges 140 substantially cover the entire display device. The external circuit can be electrically connected to any position of the shielding layer 310. In certain examples, the external circuit may be, but not limited to, a flexible printed circuit (FPC).

The following will introduce the manufacturing method of the touch panel structure according to some embodiments of the present disclosure. FIGS. 7A-7D are cross-sectional views illustrating various steps in the method for manufacturing the touch panel structure according to an embodiment of the present disclosure. It is to be understood that additional processes can be performed before, during or after the processes shown in FIGS. 7A-7D, and some of the operations in the following can be replaced or removed in the methods of certain examples. The order of the process is changeable.

Figure 7A:
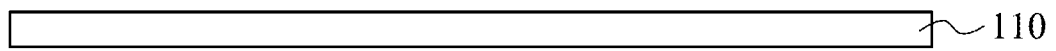
FIGS. 7A-7D are cross-sectional views illustrating various steps in the method for manufacturing the touch panel structure according to an embodiment of the present disclosure.

FIG. 7A illustrates that a display device 110 is provided. In certain examples, the display device 110 may be the same as these described above, and is not repeatedly described herein.

Figure 7B:
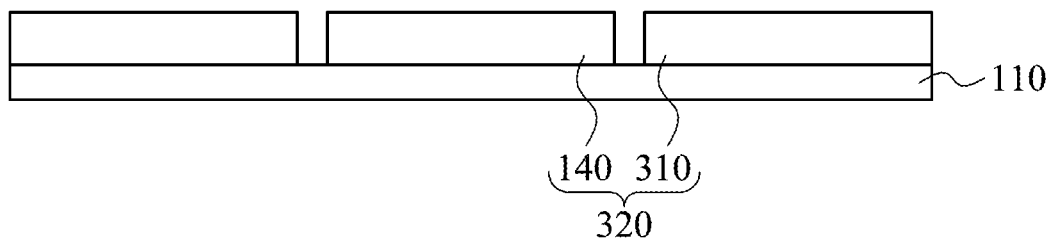

As shown in FIG. 7B, a conductive layer 320 is deposited on the display device 110, and then the deposited conductive layer 320 is etched to form a shielding layer 310 and a number of conducting bridges 140 on the display device 110. The conducting bridges 140 are spaced apart from the shielding layer 310. Therefore, the conducting bridges 140 are not in contact with the shielding layer 310 or electrically connected thereto. In certain examples, the distance between the shielding layer 310 and the conducting bridge 140 is equal to or greater than 5 μm, such as 6 μm, 7 μm, 8 μm, 9 μm, 10 μm, 15 μm or 20 μm. In certain examples, the material of the shielding layer 310 and the conducting bridges 140 may be the same as these described above, and are not repeatedly described herein. In certain examples, the shielding layer 310 and the conducting bridges 140 may be formed by deposition and photolithographic processes.

Figure 7C:
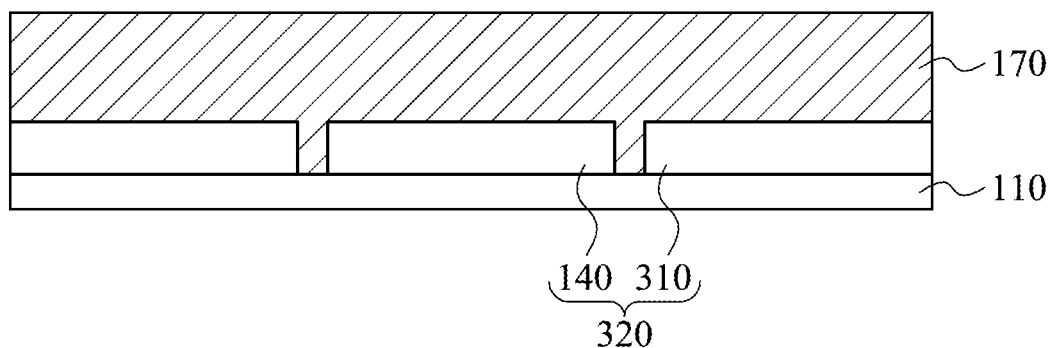
Figure 7D:
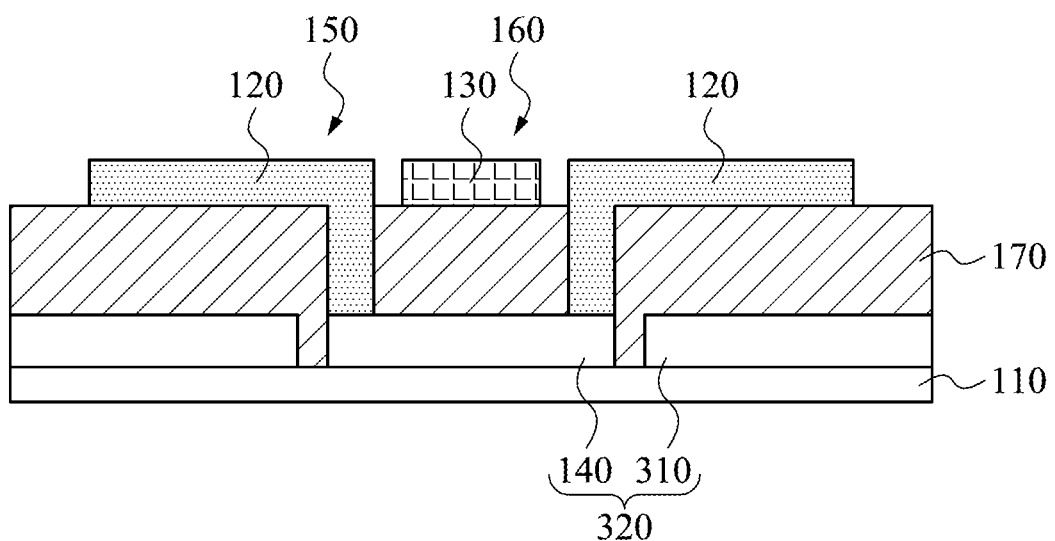

As shown in FIG. 7C, a dielectric layer 170 is deposited on the etched conductive layer 320 (i.e., shielding layer 310 and conducting bridges 140) after the conductive layer 320 is etched, and subsequently the dielectric layer 170 is patterned as shown in FIG. 7D. In certain examples, the thickness of the dielectric layer 170 is equal to or greater than 0.5 μm, such as 0.6 μm, 0.7 μm, 0.8 μm, 0.9 μm, 1 μm, 2 μm or 5 μm. In certain examples, the patterned dielectric layer 170 is formed by photolithographic and dry etching processes, or screen printing processes. In certain examples, because the dielectric layer 170 is formed after forming the shielding layer 310 and the conducting bridges 140, the dielectric layer 170 is not only formed on the shielding layer 310 and the conducting bridges 140, but also filled in the space between the shielding layer 310 and the conducting bridges 140. In certain examples, the dielectric layer 170 is patterned to make the conducting bridges 140 be electrically connected to the first sensing electrodes 120, which formed in the following steps. In certain examples, the material of the dielectric layer 170 may be the same as these described above, and is not repeatedly described herein.

As shown in FIG. 7D, after patterning the dielectric layer 170, a layer of sensing material (not shown) is deposited on the dielectric layer 170, and then the sensing material layer is patterned to form the first sensing electrodes 120 and the second sensing electrodes 130 on the dielectric layer 170. The first sensing electrodes 120 and the second sensing electrodes 130 may be formed by deposition and photolithography processes. In certain examples, the deposition process may be chemical vapor deposition (CVD), sputtering, e-beam deposition, atomic layer deposition (ALD) or other suitable process. The chemical vapor deposition may be low pressure chemical vapor deposition (LPCVD) processes, low temperature chemical vapor deposition (LTCVD) processes, rapid thermal chemical vapor deposition (RTCVD) processes, plasma enhanced chemical vapor deposition (PECVD) processes or other common processes. The first sensing electrodes 120 and the conducting bridges 140 are electrically connected in this step so as to form the first sensing circuit 150. In certain examples, the first sensing electrodes 120 and the second sensing electrodes 130 may be made of suitable conductive materials, such as indium tin oxide (ITO), silver nanowire (AgNW), carbon nanotube (CNT), graphene or a combination thereof, but not limited to these.

The examples shown in FIGS. 7A-7D are the processes which form the touch sensing device on the display device 110. In other words, when forming the touch panel structure, the display device 110 has to be provided.

FIGS. 8A-8E are cross-sectional views illustrating various steps in a method for manufacturing the touch panel structure according to another embodiment of the present disclosure. It is to be understood that additional processes can be performed before, during or after the processes shown in FIGS. 8A-8E, and some of the operations in the following can be replaced or removed in the methods of certain examples. The order of the process is changeable.

Figure 8A:
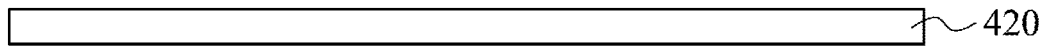
FIGS. 8A-8E are cross-sectional views illustrating various steps in a method for manufacturing the touch panel structure according to an embodiment of the present disclosure.

FIG. 8A illustrates providing a substrate 420. In certain examples, the material of the substrate 420 may be polyethylene terephthalate (PET), cyclo olefin polymer (COP), triacetyl cellulose (TAC), polyimide (PI), polycarbonate (PC), hydrophilic polyvinylidene difluoride (H-PVDF) or a combination thereof.

Figure 8B:
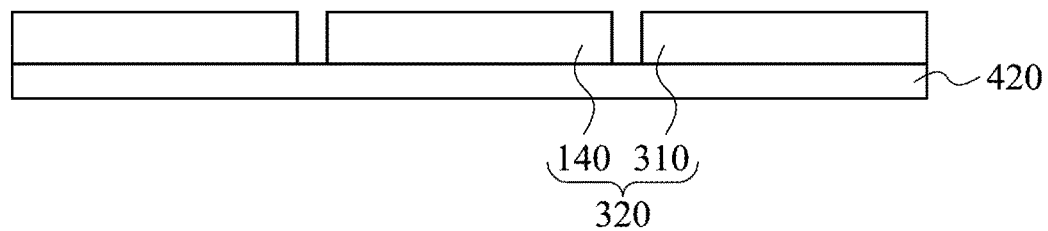

As show in FIG. 8B, a conductive layer 320 is deposited on the substrate 420, and then the deposited conductive layer 320 is etched to form a shielding layer 310 and conducting bridges 140 on the substrate 420. The conducting bridges 140 are spaced apart from the shielding layer 310. Therefore, the conducting bridges 140 are not in contact with the shielding layer 310 and not electrically connected thereto. In certain examples, the distance between the shielding layer 310 and each conducting bridge 140 is equal to or greater than 5 µm, such as 6 µm, 7 µm, 8 µm, 9 µm, 10 µm, 15 µm or 20 µm. In certain examples, the material of the shielding layer 310 and the conducting bridges 140 may be the same as these described above, and are not repeatedly described herein. In certain examples, the shielding layer 310 and the conducting bridges 140 may be formed by deposition and photolithographic processes.

Figure 8C:
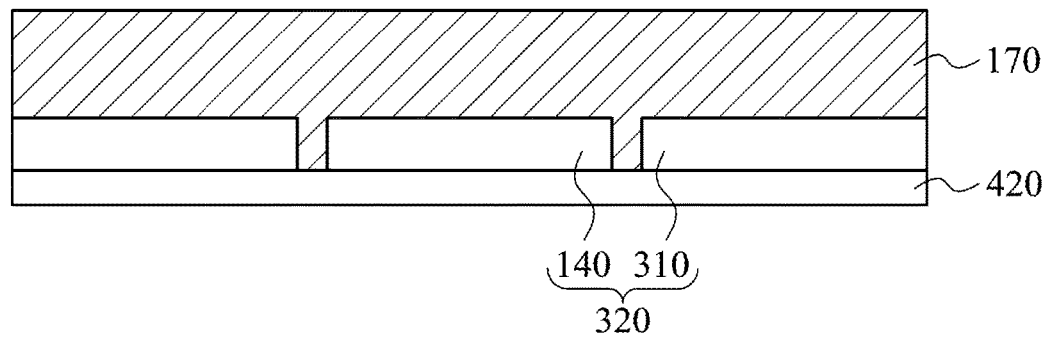
Figure 8D:
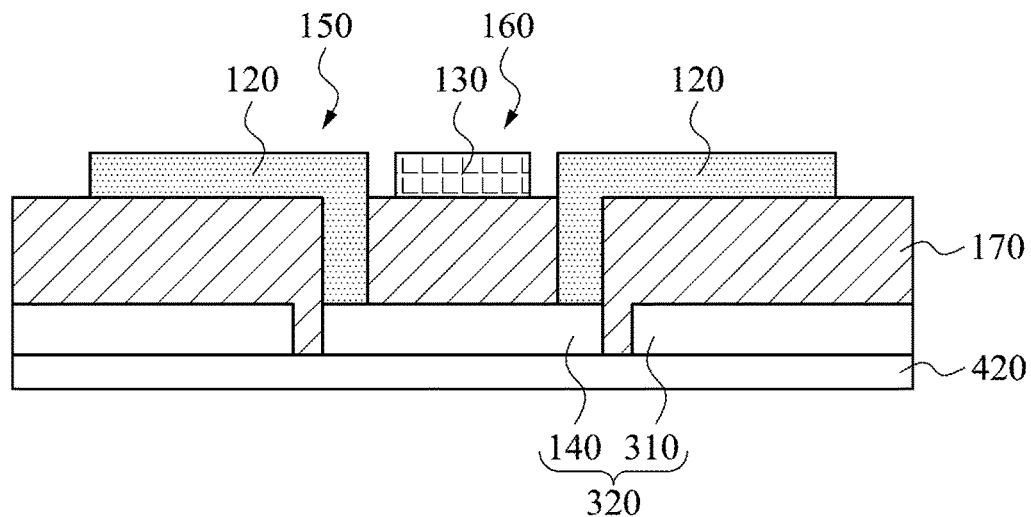

As shown in FIG. 8C, a dielectric layer 170 is deposited on the etched conductive layer 320 (i.e., shielding layer 310 and conducting bridges 140) after the conductive layer 320 is etched, and subsequently the dielectric layer 170 is patterned as shown in FIG. 8D. In certain examples, the thickness of the dielectric layer 170 is equal to or greater than 0.5 µm, such as 0.6 µm, 0.7 µm, 0.8 µm, 0.9 µm, 1 µm, 2 µm or 5 µm. In certain examples, the material of the dielectric layer 170 may be the same as these described above, and is not repeatedly described herein.

As shown in FIG. 8D, after patterning the dielectric layer 170, a layer of sensing material (not shown) is deposited on the dielectric layer 170, and then the sensing material layer is patterned to form the first sensing electrodes 120 and the second sensing electrodes 130 on the dielectric layer 170. The first sensing electrodes 120 and the second sensing electrodes 130 may be formed by deposition and photolithography processes. In certain examples, the deposition process may be the same as these described above, and is not repeatedly described herein. The first sensing electrodes 120 and the conducting bridges 140 are electrically connected in this step so as to form the first sensing circuit 150. In certain examples, the first sensing electrodes 120 and the second sensing electrodes 130 may be made of conductive materials, such as indium tin oxide (ITO), silver nanowire (AgNW), carbon nanotube (CNT), graphene or a combination thereof, but not limited to these.

Figure 8E:
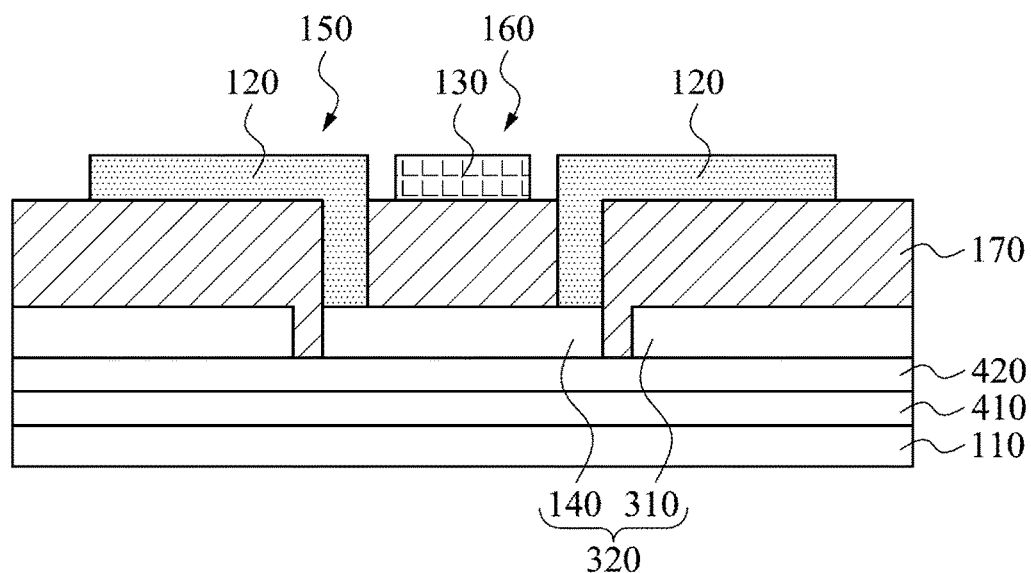

As shown in FIG. 8E, a display device 110 is bonded to the substrate 420 by the adhesive layer 410 after the formation of the first sensing circuit 150 and the second sensing circuit 160. In other words, the adhesive layer 410 is formed between the substrate 420 and the display device 110. In certain examples, the material of the adhesive layer 410 may be optical clear adhesive (OCA), optical clear resin (OCR) or a combination thereof.

The examples shown in FIGS. 8A-8E are processes of forming an add-on type touch device. There is no need to provide the display device 110 in advance prior to the manufacture of the touch sensing structure. Instead, the touch sensing structure is formed on the substrate 420 first, and subsequently the substrate 420 having the touch sensing structure thereon is bonded to the display device so as to form the touch display panel.

FIGS. 9A-9E are cross-sectional views illustrating various steps in a method for manufacturing the touch panel structure according to still another embodiment of the present disclosure. It is to be understood that additional processes can be performed before, during or after the process shown in FIGS. 9A-9E, and some of the operations in the following can be replaced or removed in the methods of certain examples. The order of the process is changeable.

Figure 9A:
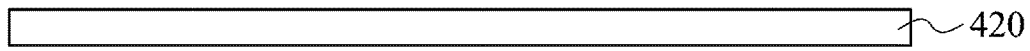
FIGS. 9A-9E are cross-sectional views illustrating various steps in a method for manufacturing the touch panel structure according to an embodiment of the present disclosure.

FIG. 9A illustrates providing the substrate 420. In certain examples, the material of the substrate 420 may be polyethylene terephthalate (PET), cyclo olefin polymer (COP), triacetyl cellulose (TAC), polyimide (PI), polycarbonate (PC), hydrophilic polyvinylidene difluoride (H-PVDF) or a combination thereof.

Figure 9B:
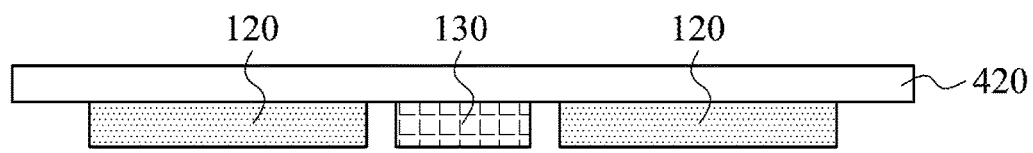

As shown in FIG. 9B, a sensing material layer (not shown) is first deposited on the substrate 420, and then the sensing material layer is patterned to form first sensing electrodes 120 and second sensing electrodes 130 on the substrate 420. The first sensing electrodes 120 and the second sensing electrodes 130 may be formed by deposition and photolithography processes. In certain examples, the deposition process may be the same as these described above, and is not repeatedly described herein. In certain examples, the first sensing electrodes 120 and the second sensing electrodes 130 may be made of conductive materials, such as indium tin oxide (ITO), silver nanowire (AgNW), carbon nanotube (CNT), graphene or a combination thereof, but not limited to these.

Figure 9C:
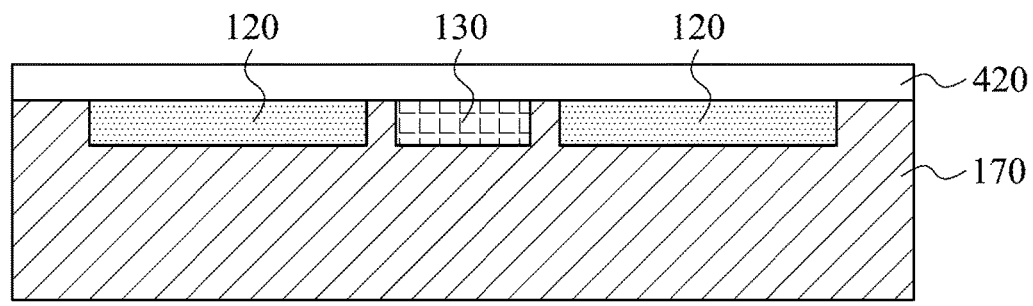
Figure 9D:
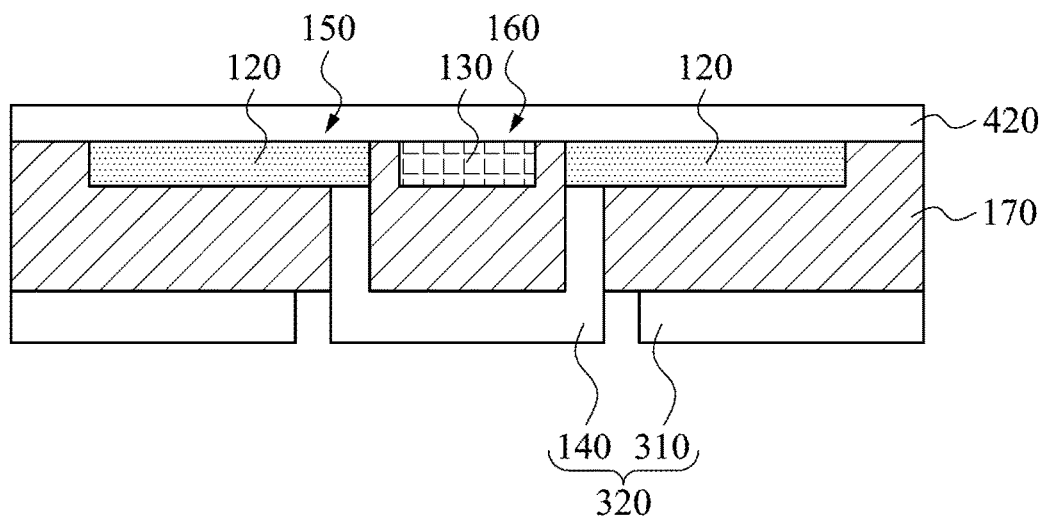

As shown in FIG. 9C, after the formation of the first sensing electrodes 120 and the second sensing electrodes 130, a dielectric layer 170 is deposited over the first sensing electrodes 120 and the second sensing electrodes 130, and subsequently the dielectric layer 170 is patterned as shown in FIG. 9D. In certain examples, the thickness of the dielectric layer 170 is equal to or greater than 0.5 µm, such as 0.6 µm, 0.7 µm, 0.8 µm, 0.9 µm, 1 µm, 2 µm or 5 µm. In certain examples, the material of the dielectric layer 170 may be the same as these described above, and is not repeatedly described herein.

As shown in FIG. 9D, a conductive layer 320 is deposited on the dielectric layer 170, and the deposited conductive layer 320 is subsequently etched to form a shielding layer 310 and conducting bridges 140 on the dielectric layer 170.

Each of the conducting bridges 140 is spaced apart from the shielding layer 310. Therefore, the conducting bridges 140 are not in contact with the shielding layer 310 and not electrically connected thereto. It is noted that adjacent two first sensing electrodes 120 are electrically connected through a corresponding one the conducting bridges 140 so as to form the first sensing circuit 150. In certain examples, the distance between the shielding layer 310 and the conducting bridge 140 is equal to or greater than 5 µm, such as 6 µm, 7 µm, 8 µm, 9 µm, 10 µm, 15 µm or 20 µm. In certain examples, the material of the shielding layer 310 and the conducting bridges 140 may be the same as these described above, and are not repeatedly described herein. In certain examples, the shielding layer 310 and the conducting bridges 140 may be formed by deposition and photolithographic processes.

Figure 9E:
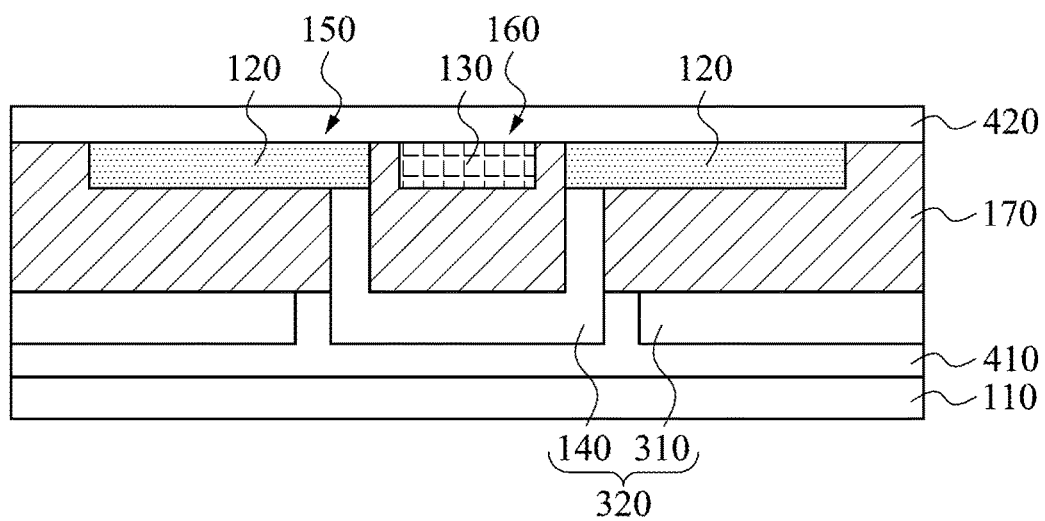

As shown in FIG. 9E, a display device 110 is bonded to the conductive layer 320 (i.e., shielding layer 310 and conducting bridges 140) by an adhesive layer 410 after the formation of the shielding layer 310 and the conducting bridges 140. In other words, the adhesive layer 410 is formed between the conductive layer 320 and the display device 110. In certain examples, the material of the adhesive layer 410 may be optical clear adhesive (OCA), optical clear resin (OCR) or a combination thereof.

The examples shown in FIGS. 9A-9E are processes of forming an add-on type touch devices. There is no need to provide the display device 110 in advance prior to the manufacture of the touch sensing structure. Instead, the touch sensing structure is formed on the substrate 420 first, and subsequently the substrate 420 having the touch sensing structure thereon is bonded to the display device so as to form the touch display panel.

If the distance between the display device and each of the first and second sensing circuits is too small, the signal-to-noise ratio would be too low, that leads to the difficulties in judging the touch signal and results in the decline in accuracy. In the embodiments of the present disclosure, the conducting bridges and the shielding layer are formed and extended on a same level, and the distance between the display device and the touch sensing circuits may be increased to enhance the signal-to-noise ratio while the total thickness of the touch display panel is not increased. In the implementation of this disclosure, the shielding layer and the conducting bridges may be integrated into a single process, and therefore the embodiments disclosed herein are advantageous in simplifying the manufacturing process, thinning the touch display panel, and achieving the shielding the signal interference from the display device.

Although the present disclosure has been described in considerable detail with reference to certain examples thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch panel structure, comprising:
a display device;
a dielectric layer disposed on the display device;
a first sensing circuit comprising:
a plurality of first sensing electrodes disposed on the dielectric layer; and
a plurality of conducting bridges disposed between the dielectric layer and the display device, wherein adjacent ones of the first sensing electrodes are electrically connected with each other through one of the conducting bridges;
a second sensing circuit comprising a plurality of second sensing electrodes disposed on the dielectric layer, and the second sensing circuit is insulated from and crosses the first sensing circuit; and
a shielding layer disposed between the dielectric layer and the display device, the shielding layer being coplanar with the conducting bridges and insulated from the conducting bridges, wherein the conducting bridges and the shielding layer are constituted of a conductive layer, and a distance between the shielding layer and each of the conducting bridges is equal to or greater than 5 µm.

2. The touch panel structure of claim 1, further comprising an adhesive layer and a substrate, wherein both the adhesive layer and the substrate are disposed between the conductive layer and the display device, wherein the substrate is disposed on the adhesive layer.

3. The touch panel structure of claim 1, further comprising:
an adhesive layer disposed between the conductive layer and the display device; and
a substrate disposed on the first sensing electrodes and the second sensing electrodes.

4. The touch panel structure of claim 1, wherein a material of the conductive layer is indium tin oxide (ITO), poly(3, 4-ethylenedioxythiophene) (PEDOT), carbon nanotube (CNT), silver nanowire (AgNW), polyvinylidene difluoride (PVDF), transparent conductive transfer film (TCTF) or a combination thereof.

5. The touch panel structure of claim 1, wherein a thickness of the dielectric layer is equal to or greater than 0.5 µm.

6. A manufacturing method of a touch panel structure, comprising:
forming a conductive layer;
etching the conductive layer to form a shielding layer and a plurality of conducting bridges, wherein the conducting bridges and the shielding layer are positioned on a same plane, and a distance between the shielding layer and each of the conducting bridges is equal to or greater than 5 µm;
forming a dielectric layer over the conductive layer;
forming a plurality of sensing electrodes and a plurality of first sensing circuits on the dielectric layer, wherein the first sensing circuits are insulated from the sensing electrodes; and
electrically connecting adjacent two of the sensing electrodes to a corresponding one of the conducting bridges to form a plurality of second sensing circuits.

7. The manufacturing method of claim 6, wherein forming the conductive layer comprises forming the conductive layer on a first display device or a substrate.

8. The manufacturing method of claim 7, wherein the conductive layer is formed on the substrate, and the substrate is bonded to a second display device.

9. A method of manufacturing a touch panel structure, comprising:
providing a substrate;

forming a plurality of sensing electrodes and a plurality of first sensing circuits on the substrate, wherein the first sensing circuits are insulated from the sensing electrodes;

forming a dielectric layer on the sensing electrodes and the first sensing circuits;

concurrently forming a shielding layer and a plurality of conducting bridges on the dielectric layer, and electrically connecting adjacent two of the sensing electrodes to a corresponding one of the conducting bridges, wherein the sensing electrodes are connected with the conducting bridges in series to form a plurality of second sensing circuits, and a distance between the shielding layer and each of the conducting bridges is equal to or greater than 5 µm; and bonding a display device with the shielding layer and the conducting bridges.

* * * * *